Nov. 21, 1950     W. A. HARE     2,530,962
FORMATION OF SHAPED ARTICLES FROM
ACRYLONITRILE POLYMERS
Filed Sept. 24, 1948
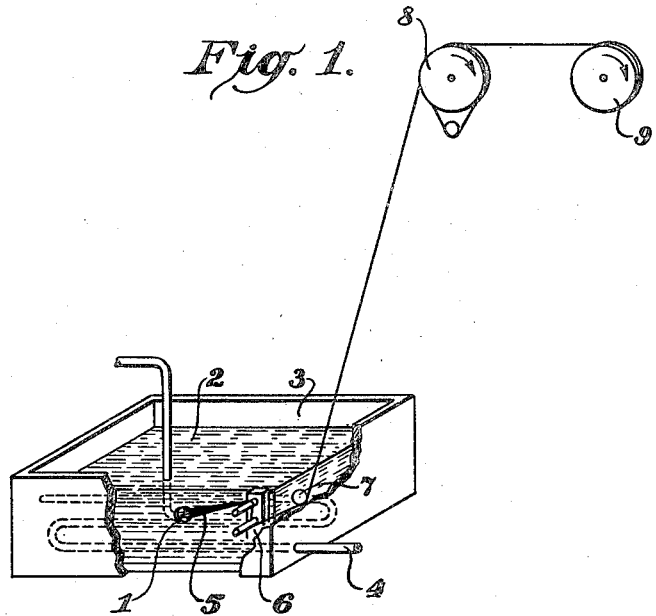
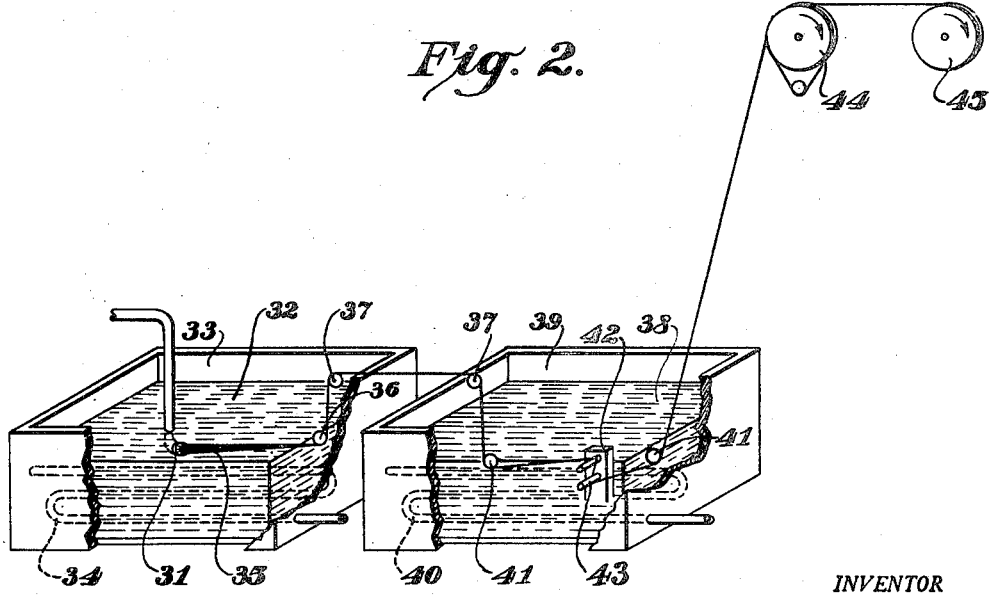
INVENTOR
Weston Andrew Hare,
BY
ATTORNEY Patented Nov. 21, 1950

2,530,962

UNITED STATES PATENT OFFICE 2,530,962

FORMATION OF SHAPED ARTICLES FROM ACRYLONITRILE POLYMERS

Weston Andrew Hare, Kenmore, N. Y., assignor to E. I. du Pont de Nemours & Company, Wilmington, Del., a corporation of Delaware Application September 24, 1948, Serial No. 50,964

11 Claims. (Cl. 18—54)

This invention relates to shaped articles, such as yarns, films, bristles, tubings and the like, of acrylonitrile polymers. More particularly, the invention relates to a process for the wet-spinning or casting of acrylonitrile polymers to obtain shaped articles possessing a high tenacity, a desirable elongation and a lustrous appearance and being substantially free of voids.

Although the process of this invention is generally applicable to the production of any shaped article of an acrylonitrile polymer, it will, for convenience, be discussed in connection with the wet-spinning of yarns of acrylonitrile polymer.

Acrylonitrile polymers possess, in addition to other desirable properties, a high degree of toughness and insolubility in and resistance to the action of common solvents. British Patent No. 459,596 discloses that acrylonitrile polymers are soluble in highly concentrated aqueous solutions of hydrated salts, such as lithium bromide, zinc chloride and sodium sulfocyanate, and that the polymers can be precipitated from such solutions by the addition of water, aqueous salt solutions or acids. When such solutions of acrylonitrile polymers are extruded into the aforementioned precipitating liquids with the view of obtaining shaped articles such as yarns, films, etc., the shaped articles are extremely weak and filled with voids. They are so extremely brittle that they are practically incapable of being used as yarns or films. Moreover, particularly in the case of multi-filament yarns, the individual filaments tend to stick together to form a single, rigid structure.

British Patent No. 461,675 discloses that acrylonitrile polymers can be dissolved in molten quaternary ammonium salts, such as benzyl pyridinium chloride and reprecipitated by the addition of water, dilute salt solutions or acids. However, shaped articles prepared by the extrusion of such solutions into these liquids are also weak, filled with voids and extremely brittle. They are equally incapable of being used as yarns or films.

More recently, it has been discovered that acrylonitrile polymers can be dissolved in certain volatile organic solvents, and shaped articles, such as yarns, films, etc., of the polymer have been obtained by extruding such solutions into precipitating baths of the type mentioned above. The structures obtained in this manner differ from those obtained from the previously proposed acrylonitrile polymer solutions in that they are not so extremely brittle. Moreover, in the case of a multi-filament yarn, the individual filaments do not appear to be matted or stuck together. However, the structures still possess numerous voids throughout their length and the yarns possess too low a tenacity and elongation to permit them to be used in the textile art. Still more recently, coagulating baths of glycerol, aqueous calcium chloride solutions and aqueous zinc halide solutions have been successfully employed as shown, respectively, in U. S. 2,426,719, in copending application U. S. Serial No. 735,666, filed March 19, 1947, now Patent No. 2,451,420, and in copending application U. S. Serial No. 746,651, filed May 8, 1947, now Patent No. 2,467,-553. While these processes provide marked advances in the art of forming shaped articles from acrylonitrile polymers, for example, by producing yarns which are not filled with voids certain improvements are desirable in the characteristics of the shaped articles produced and in economy of production.

It is an object of this invention to provide an improved process for producing shaped articles of acrylonitrile polymers. A further object is the production of improved articles. A more specific object is the provision of a process for the wet-spinning of an acrylonitrile polymer yarn to produce thereby a yarn that possesses a high tenacity and elongation, has a lustrous appearance, and is substantially free of voids along its length. Another object of this invention is to provide an improved spinning bath for use in such a process. Other objects will become apparent from the description of the invention hereinafter set forth.

The objects of this invention are accomplished, in general, by extruding a solution of an acrylonitrile polymer in a volatile organic solvent through a shaped orifice into a spinning bath heated to a temperature of about 70° C. or over and comprising a liquid that is a non-solvent for the polymer but is capable of producing a compact yarn, and passing the yarn through the bath for a distance sufficiently long to substantially completely coagulate it. The objects are accomplished particularly well by extruding the solutions into an aqueous solution of a thiosulfate containing at least 12% by weight of the salt. The resultant article formed is preferably stretched in the bath to an extent of about 100% and is then removed and given a further stretch treatment.

The following description of the process of this invention and the examples showing its practice will be more clearly understood if reference is made to the accompanying drawings wherein:

Figure 1 illustrates diagrammatically a preferred apparatus suitable for use in the practice of this invention; and Figure 2 illustrates diagrammatically a modified form of apparatus that is also suitable for use in the practice of this invention.

Referring now to Figure 1, the reference numeral 1 indicates a multi-hole spinneret through which an acrylonitrile polymer solution is extruded into a spinning bath 2 contained in a trough 3 provided with heating coils 4. In its travel through the spinning bath 2, the yarn 5 formed by the coagulation of the polymer is subjected to tension by tension means comprising a pair of stationary snubbing pins 6. The tensioned yarn, after being led through the bath for the remainder of its travel by a guide 7, is passed without slippage about a positively driven roller or feed wheel 8, and the yarn is subsequently passed to a collecting device, such as a rotating bobbin 9.

Referring now to Figure 2 wherein a modified form of apparatus for use with the invention is illustrated, the reference numeral 31 designates a multi-hole spinneret through which an acrylonitrile polymer solution is extruded into a spinning bath 32 contained in a trough 33, provided with heating coils 34 capable of maintaining the bath at a temperature of at least 100° C. The yarn 35 is led through the bath 32 by a guide 36 and is conducted over guides 37 which serve to lead the yarn 35 from the bath 32 into a bath 38 contained in a trough 39, which is also provided with heating coils 40 capable of maintaining the bath 38 at a temperature of at least 100° C., and preferably 150° C. or higher. Roller guides 41 serve to lead the yarn 35 through the bath 38. The roller guides 36, 37 and 41 are of the type which exert no substantial tension on the yarn passing thereover or thereunder.

A tension device 42, which comprises a pair of stationary snubber pins 43, is mounted in the bath 38 in the path of travel of the yarn 35 therein and it imparts a tension to the yarn passing therethrough. The tensioned yarn is then withdrawn from the bath by a positively driven feed wheel 44 and passed to a collection device, such as a rotating bobbin 45.

The following examples illustrate preferred methods of practicing this invention and are not limitative. The parts referred to are by weight.

*Example I*

A solution of 12 parts of acrylonitrile polymer possessing an average molecular weight of approximately 86,000, as determined from viscosity measurements by the Staudinger formula, in 88 parts of gamma-butyrolactone was extruded at a temperature of 100° C. through a 60-hole spinneret (hole diameter of 0.0030") into a spinning bath consisting of a 50% aqueous solution of hypo ($Na_2S_2O_3 \cdot 5H_2O$ or 32% of $Na_2S_2O_3$) maintained at a temperature of 104° C., the solution being extruded at a rate of 10 grams per minute. The yarn was led through the bath for a total distance of six inches. On leaving the bath, the yarn was passed five times around a drum in connection with a grooved idler roller, the drum having a peripheral speed of 300 inches per minute. The yarn was then passed through air and four times around a second drum in combination with a grooved idler roller, the second drum having a peripheral speed of 1,200 inches per minute. The tension on the yarn being stretched four times its original length in this manner was 125 grams between the stretching rolls or 0.30 g. p. d. based on actual denier at point of tension. The yarn was passed from the second drum to a frictionally driven, traversed bobbin and wound at low tension. The bobbin package was then washed with water, dried, and the yarn drawn three times its length between rolls heated to 192° C. After this drawing operation, the yarn was twisted four turns per inch and heat-treated in skein form at 125° C. for one hour. The final 60-filament yarn had a denier of 127. The physical properties of this yarn were as follows:

Dry tenacity _____ g. p. d __ 4.5
Wet tenacity _____ g. p. d __ 3.6
Loop tenacity _____ g. p. d __ 2.5
Dry elongation _____ percent __ 12.8
Wet elongation _____ do ____ 12.4
Loop elongation _____ do ____ 8.6

A second bobbin package of this yarn was drawn three times its length between rolls heated to 172° C. before washing with water. The final yarn was washed with water, dried, twisted and skein heat-treated as described above. The properties of this yarn were as follows:

Dry tenacity _____ g. p. d __ 3.9
Wet tenacity _____ g. p. d __ 4.3
Loop tenacity _____ g. p. d __ 2.8
Dry elongation _____ percent __ 13.2
Wet elongation _____ do ____ 14.4
Loop elongation _____ do ____ 10.0

*Example II*

The acrylonitrile polymer solution of Example I was extruded in the manner of that example into a spinning bath consisting of a 30% aqueous solution of hypo (19% $Na_2S_2O_3$) maintained at a temperature of 100° C. After a bath travel of six inches, the yarn was drawn three times its original length in air between the drums described in Example I. The yarn was wound on a bobbin at low tension, washed, dried, and subsequently drawn 200% and heat-treated as described in Example I. The properties of this yarn are as follows:

Dry tenacity _____ g. p. d __ 3.2
Wet tenacity _____ g. p. d __ 2.8
Loop tenacity _____ g. p. d __ 2.2
Dry elongation _____ percent __ 10
Wet elongation _____ do ____ 9.6
Loop elongation _____ do ____ 6.5

With gamma-butyrolactone solutions, greater spinning speed can be obtained as the concentration of sodium thiosulfate in the coagulating bath is decreased below 50% concentration (32% $Na_2S_2O_3$). However, a more brittle yarn having somewhat lower physical properties is produced. A spinning bath consisting of 40% aqueous solution of hypo (25% $Na_2S_2O_3$) maintained at a temperature of 100° C. appears to give the optimum balance between spinning speed and physical properties. For example, the butyrolactone solution of Example I was extruded into a 40% aqueous hypo solution (25% $Na_2S_2O_3$) at such a rate that the yarn could be collected at low tension on the first drum at a speed of 1,500 inches per minute. This yarn was washed and dried, and subsequently stretched six times its original length on the hot rolls as previously described. After twisting and a skein heat-treatment, this yarn had a tenacity of 3 grams per denier and a dry elongation of 12%.

*Example III*

A solution of 20 parts of acrylonitrile polymer possessing an average molecular weight of approximately 86,000 in 80 parts of dimethyl formamide was extruded into a spinning bath consisting of a 50% aqueous solution of hypo (32% Na₂S₂O₃) maintained at a temperature of between 98 and 100° C. through a 60-hole spinneret (hole diameter of 0.004") with the aid of a pump which delivered 11 grams of polymer solution per minute. The solution was extruded into a tube (48 inches long and 1 centimeter inside diameter) placed 1" from the spinneret immersed in the bath. The lower end of the tube protruded into a secondary bath placed inside the main coagulating bath. The level of the coagulating liquid in the secondary bath was kept ¾" lower than the main bath level by means of a pump which continuously emptied its contents into the main bath. As it left the tube, the yarn was passed around a suitable guide placed at the lower end of the tube and was collected on a bobbin at the rate of 1,200 inches per minute. The use of the tube permits higher speeds by protecting the filaments near the spinneret. In addition, the concurrent flow of the coagulating liquid through the tube with the yarn gives a highly desirable lower tension on the yarn. While the use of minimum tension when leaving the bath yields a rather brittle yarn, it permits increasing the speed of production considerably, permits a greater degree of stretching in the subsequent step and produces yarn having good physical properties after subsequent drawing and relaxing operations. In this example, the bobbin package was washed with water under a shower and dried. The yarn was then stretched 8.5 times its original length between rolls heated to 196° C., twisted four turns per inch, and finally heat-treated in skein form in an oven at 125° C. for one hour. The resultant 60-filament 83 denier yarn had the following physical properties:

| | | |
|---|---|---|
| Dry tenacity | g.p.d | 4.5 |
| Wet tenacity | g.p.d | 4.2 |
| Loop tenacity | g.p.d | 2.6 |
| Dry elongation | percent | 12.2 |
| Wet elongation | do | 13.4 |
| Loop elongation | do | 7.8 |

When the experiment described in Example III was repeated using a 40% aqueous solution of hypo (25% Na₂S₂O₃) as the coagulating bath, a polyacrylonitrile yarn having the following properties was prepared:

| | | |
|---|---|---|
| Dry tenacity | g.p.d | 3.8 |
| Wet tenacity | g.p.d | 3.8 |
| Loop tenacity | g.p.d | 2.1 |
| Dry elongation | percent | 11.8 |
| Wet elongation | do | 13.4 |
| Loop elongation | do | 7.2 |

When a 70% aqueous solution of hypo (45% Na₂S₂O₃) was used as the coagulating bath, the pump delivery was reduced to 6 parts per minute and the resulting yarn was collected at the rate of 600 inches per minute. After a water wash, this yarn was stretched 8.3 times its original length, twisted and heat-treated as previously described to yield a 104 denier yarn having the following properties:

| | | |
|---|---|---|
| Dry tenacity | g.p.d | 4.0 |
| Wet tenacity | g.p.d | 3.8 |
| Loop tenacity | g.p.d | 2.7 |
| Dry elongation | percent | 12.3 |
| Wet elongation | do | 13.1 |
| Loop elongation | do | 8.6 |

*Example IV*

A solution of 15 parts of the acrylonitrile polymer described in Example I in 85 parts of ethylene cyclic carbonate was extruded into a spinning bath consisting of a 28% aqueous solution of hypo (18% Na₂S₂O₃) maintained at a temperature of 100° C. through a 60-hole spinneret (hole diameter 0.004") using a pump delivery of 5 grams per minute. The yarn was led through the bath for a total distance of 20 inches, the yarn being subjected during its travel to a tension sufficient to stretch the yarn 100% (twice its original length) by means of a snubbing tension guide comprising two stationary pins mounted within the bath. On leaving the bath, the yarn was collected on a bobbin possessing a peripheral speed of 520 inches per minute. The fully wound bobbin package was washed free of the bath liquid with water and dried. The yarn was then stretched four times its length between hot rolls at 189° C., twisted four turns per inch, and finally heat-treated in skein form at 125° C. for one hour. The resulting 287 denier yarn had the following physical properties:

| | | |
|---|---|---|
| Dry tenacity | g.p.d | 3.0 |
| Wet tenacity | g.p.d | 2.9 |
| Loop tenacity | g.p.d | 2.1 |
| Dry elongation | percent | 15.1 |
| Wet elongation | do | 15.4 |
| Loop elongation | do | 11.5 |

When the experiment described in Example IV was repeated using a 20% aqueous hypo solution (12% Na₂S₂O₃), a satisfactory yarn having slightly lower physical properties was obtained. Coagulating baths containing somewhat higher concentrations of hypo can be used but the bath travel must be correspondingly increased. When wet-spinning ethylene cyclic carbonate solutions of acrylonitrile polymers into the baths of this invention, it is preferred to use a sodium thiosulfate concentration corresponding to that of a 20 to 40% hypo solution with 30% optimum. For dimethyl formamide solutions concentrations of hypo of 40% to 70% are useful, the optimum range being 50% to 60%. For gamma-butyrolactone solutions, the desirable range is 30% to 50% with 40% as the optimum. The bath should contain at least 20% of the salt and can contain as much as 70%, i. e. 12% to 45% of a thiosulfate calculated as the anhydrous salt. One skilled in the art will adjust the concentration to fit the partcular solvent being used, the temperatures employed, etc. in order to get the proper rate of coagulation.

While this invention has been described in particular using hypo in the coagulating bath, other water-soluble thiosulfates may be employed. For example, if 32% potassium thiosulfate (K₂S₂O₃) solutions are used in Example I instead of the 32% Na₂S₂O₃ solution, similar results are obtained. Likewise, aqueous solutions of ammonium thiosulfate, e. g., 32% (NH₄)₂S₂O₃, can be used. Mixtures of the thiosulfates can also be used. In general, aqueous solutions containing 12% to 45% of thiosulfate calculated as the anhydrous salt may be employed in this invention.

The acrylonitrile polymer, of which the shaped articles are formed, is preferably prepared by the ammonium persulfate catalyzed polymerization of monomeric acrylonitrile dissolved or emulsified in water. It can, however, be prepared by any other suitable type of polymerization reaction, such as, for example, the emulsion-type reaction disclosed by U. S. Patent No. 2,160,054 to Bauer et al.

The polymer, of which the shaped articles are formed in accordance with this invention, must of course be of a sufficiently high molecular weight to possess film- or filament-forming properties. The polymer employed possesses an average molecular weight within the range of 25,000 to 750,000, or even higher, and preferably within the range of 40,000 to 250,000, as calculated from viscosity measurements by the Staudinger equation:

$$\text{Molecular weight} = \frac{N_{sp}}{K_m C}$$

wherein:

$$K_m = 1.5 \times 10^{-4}$$

$$N_{sp} = \text{specific viscosity} = \frac{\text{viscosity of solution}}{\text{viscosity of solvent}} - 1$$

and

C = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. When the monomer is present in 5% aqueous solution maintained at a temperature of from 3° C. to 5° C., it is found that the use of 4% of ammonium persulfate catalyst (based on the weight of the acrylonitrile) results in the formation of a polymer having a molecular weight (as calculated by the above equation) of approximately 60,000. Increasing or decreasing the amount of the catalyst, while maintaining the other conditions constant, decreases or increases the molecular weight of the polymer. The polymer preferably comprises a simple polymer of acrylonitrile. However, interpolymers of acrylonitrile and other polymerizable substances, such as vinyl acetate, vinyl chloride, esters or other derivatives of acrylic or methacrylic acids, styrene, vinyl pyridines, isobutylene and other polymerizable substances, may also be used. However, for the final yarn to possess the desirable properties of polymerized acrylonitrile (such as resistance to acids and common solvents), it is necessary that the polymer contain a major portion of acrylonitrile, and those polymers that are prepared from at least 80 parts of acrylonitrile and no more than 20 parts of another polymerizable substance are preferred. For example, a solution of a 90/10 copolymer of acrylonitrile/2-vinyl pyridine in ethylene carbonate can be spun in accordance with the conditions of Example I to form a satisfactory yarn.

The polymer can be dissolved in any suitable solvent. However, it is preferred that the solvent comprise a volatile organic substance. The term "volatile organic solvent," as used in this specification, is meant to include those organic substances that are capable of forming stable homogeneous solutions with an acrylonitrile polymer and that can be distilled without decomposition at atmospheric pressure. Suitable volatile organic solvents for use with this invention include dimethyl formamide, dimethyl methoxyacetamide, N-formyl morpholine, N-formyl hexamethylene imine, butadiene cyclic sulfone, tetramethylene cyclic sulfone, gamma-butyrolactone, ethylene cyclic carbonate, p- phenylene diamine, and the m- and p-nitrophenols. This class of substances is further exemplified in U. S. Patent Nos. 2,404,714–2,404,728, inclusive. Accordingly, any volatile organic solvent which forms the requisite polymer solutions and which has the desired stability may be used in the process of this invention.

The preferred concentration of the spinning solution is, of course, dependent on the solvent employed and on the average molecular weight of the polymer, it generally being desirable to use more dilute solutions in the spinning of polymers of high molecular weight. When the solution is to be extruded through a conventional type orifice, it should possess a viscosity of from 50 to 500 poises, this viscosity being obtained by properly adjusting the temperature of the solution prior to extrusion. Ordinarily solutions containing from 10 to 30% of the polymer are satisfactory for use with this invention.

Solution temperatures of from 80 to 120° C. are generally employed in this invention, although they are not critical. The temperature should be kept above the point at which a gel forms. On the other hand, if too high a temperature is used, the resultant yarn may possess undesirable color.

The description previously set forth indicates that the spinning baths of this invention should be maintained at a temperature of 70° C., or higher. However, there is nothing critical about this temperature and, generally speaking, the bath can be maintained at any desired temperature provided only that the bath at that temperature is capable of precipitating the polymer in the form of a yarn. The bath temperature should, of course, not exceed the boiling point of the solvent employed in the spinning solution. If it does, undesirable boiling of the solvent will occur with the resultant formation of minute bubbles in the yarn. Generally, temperatures around 90° to 100° C. are employed.

It is generally preferred in the practice of this invention to employ a bath travel of the order of 6 to 48 inches. However, this is not essential and bath travels as short as 4 inches can be used, if desired. On the other hand, much longer bath travels of the order of 100 to 200 or more inches can also be used. Such long bath travels are especially useful in the spinning of a heavy denier yarn or a large bundle of filaments intended for conversion into staple fibers. The preferred distance of bath travel depends on the rate of coagulation of the polymer solution into dense and compact filaments. This in turn is affected by the efficiency of the solvent for the polymer and by the concentration of sodium thiosulfate in the coagulating bath.

The use of tension devices in the coagulating baths of this invention is optional. One or more snubbing pins may be placed in the bath at various distances from the spinneret depending on the rate of coagulation of the filaments. When ethylene cyclic carbonate solutions of polyacrylonitrile are being spun into sodium thiosulfate baths, tension devices, if used, should be placed ten or more inches from the spinneret, although they may be placed closer. When other solvents for acrylonitrile polymers are used for wet-spinning according to this invention, snubbing pins and the like may be located closer to the spinneret. In the case of aqueous spinning baths containing relatively low concentrations of sodium thiosulfate, by reason of rapid coagulation of the spinning solutions, the first snubbing pin can be placed as close as one inch from the spinneret, and as described in Example I, relatively short bath travels may be used.

It has been found that, in general, an acrylonitrile polymer yarn spun without any appreciable orientation in the spinning bath is brittle and hard to handle in subsequent stretching operations even though the yarn may have good properties after stretching. A method to circumvent this, is to apply some slight orientation, for example 100-200% stretch, during spinning. For example, tensions of 0.3 or 0.4 and, under some conditions, up to 1.0 gram per denier may be applied to the yarn in the bath. In this manner, the yarn may be more readily processed thereafter without losing the economic advantage inherent in a stretching step. In Example IV, yarn was spun at 520 inches per minute using tension sufficient to stretch the yarn 100% in the bath and the yarn was subsequently stretched four more times its length. This yarn could have spun at 260 inches per minute under no appreciable tension and subsequently stretched eight times its original length by suitable means. The spinning production per nozzle would be the same but much easier handling of the yarn during the afterstretch results from the former method which is, therefore, preferred. In the afterstretching, tensions of 1.0 gram per denier or higher may be employed.

On leaving the spinning bath, the yarn is collected in suitable package form, preferably on a rotating bobbin under somewhat reduced tension. The yarn package may then be washed to free it of occluded spinning bath and dried, or the yarn may be afterstretched prior to this washing step. If desired, a finishing agent may be applied to the yarn at the end of the washing operation and the dried yarn twisted and wound into final package form for commercial use. The yarns are bright, lustrous, and substantially free of voids. They possess dry tenacities of from 2.5 to 5 grams per denier, together with elongations of from 15% to 10%. They also possess desirable knot and loop tenacities. Moreover, when heated under tension for extended periods of time, the yarns show a remarkable retention of tenacity with only slight gain in elongation; for example, a typical yarn possessing a tenacity of 4.2 grams per denier and an elongation of 13% wi'l possess, after being heated for one hour at 100° C. under tension, a tenacity of 4.1 grams per denier and an elongation of 13%. This is quite surprising in view of the normal behavior of polymeric yarns which customarily show a marked loss in tenacity (30% to 40%) and a sharp gain in elongation (100% or more of the original value) when treated in such a manner. This remarkable property of the yarns of this invention makes them eminently suited for many purposes.

On the other hand, if the purified dried yarns of this invention are heated in a relaxed state to temperatures of the order of 130° C. to 200° C., in accordance with the teachings of co-pending application Serial No. 496,396, filed July 28, 1943, now Patent No. 2,445,042, the yarns do tend to shrink somewhat and such an after-treatment can be used to increase the elongation of the yarns to a point where they are satisfactory for use in the textile art. It is only in the case of yarns possessing a very high tenacity (for example 6 g. p. d. or higher) that any appreciable loss in tenacity is occasioned by this treatment. Even then, the tenacity does not usually fall below 4.5 grams per denier. On the other hand, when the dried yarn possesses a dried tenacity of 4 grams per denier or less, this relaxed heating treatment may serve to increase both the elongation and the tenacity.

The sodium thiosulfate spinning baths of this invention have certain desirable advantages over the previously disclosed coagulating baths for the wet-spinning of acrylonitrile polymer solutions. U. S. 2,426,719 discloses that glycerin at temperatures between 100 and 140° C. comprises a suitable spinning bath for acrylonitrile fibers. However, glycerin is an expensive spinning bath and requires relatively high temperatures for best yarn properties. Specific aqueous salt baths containing various percentages of calcium chloride and zinc halide are disclosed as coagulating baths for the preparation of acrylonitrile polymer filaments in co-pending applications Serial No. 735,666, now Patent No. 2,451,420 and Serial No. 746,651, now Patent No. 2,467,553, respectively. These calcium chloride, zinc halide and other highly soluble, more or less acidic, baths, while useful for this purpose, have certain disadvantages. Their hot concentrated solutions are corrosive, attacking stainless steel, lead, and other materials which might be used in bath tanks and also are capable of causing skin irritation to the operators. On the other hand, sodium thiosulfate is a highly soluble salt which is practically neutral and is non-corrosive to stainless steel and most unlikely to cause skin irritation. In addition, this salt is inexpensive as compared to most other materials suggested as spinning bath components for coagulating acrylonitrile polymer solutions.

It has also been found that the yarn spun into a sodium thiosulfate coagulating bath may advantageously be after-stretched prior to washing out the spinning salt, as described in the last paragraph of Example I. A more dense and stronger fiber capable of a greater degree of orientation is produced by this means. This is probably possible in the case of the sodium thiosulfate baths because of the nature of the crystals remaining on the yarn. Sodium thiosulfate crystals (hydrated) melt at a relatively low temperature at the time of stretching and, therefore, do not damage the fibers. Yarns prepared in aqueous calcium chloride baths do not respond to this preferred treatment to yield products having improved properties.

Salt solutions, in general, cannot be used as coagulating baths as in the manner of this invention. For example, aqueous solutions, dilute or concentrated, of sodium chloride, sodium sulfate, magnesium sulfate and potassium chloride cannot be used to give satisfactory shaped articles. It is thought that water and dilute salt baths, for example less than 10% of any salt, set up the yarn too rapidly by diffusion of water into the fibers and under these conditions yarns of only fair quality may be spun even at low spinning speeds. This rapid coagulation results in a dense skin on the surface of the filament which prevents a uniform shrinkage of the filament, resulting ultimately in porous yarn. The addition of a considerable amount of a salt, particularly a salt which is highly hydrated in solution, reduces the activity of the water in the bath and permits more uniform setting up of the filament throughout its cross-section with a resultant more dense structure. Non-hydrated salts, such as sodium chloride, and others of relatively low solubility, such as sodium sulfate, are not desirable in concentrations much above 10% because the presence of the polymer solvent in the area next to the spinneret holes results in precipitation of the salts around the holes, which interferes with spinning.

This invention provides a class of spinning baths that is eminently suited for use in the wet-spinning of acrylonitrile polymer yarns. It also provides a wet-spinning process for the manufacture of such yarns, which yarns possess a desirable tenacity and elongation and are eminently suited for use in the textile art. The freshly spun yarns of this invention are lustrous and substantially free of voids. Moreover, they are not brittle and they exhibit an unexpectedly high retention of their tenacity and elongation on exposure under tension to elevated temperatures.

The process of this invention makes it possible to produce highly desirable yarns in a single spinning operation without the use of additional after-treatments of any sort. After-stretching is advantageously combined with this invention to produce yarns having improved tensile properties. Again, if desired, the yarns can be subjected to a simple after-treatment to greatly improve elongation without at the same time causing any marked lowering in tenacity or loss of other desirable properties. The process of this invention does not require the use of complicated apparatus. It can be performed on existing machinery of the type employed, for example, in the wet-spinning of viscose rayon yarns.

Any departure from the above description which conforms to the present invention is intended to be included within the scope of the claims.

I claim:

1. A process for wet spinning of acrylonitrile polymer yarn which comprises extruding a solution, in a volatile organic solvent of acrylonitrile polymer containing a major portion of acrylonitrile through a shaped orifice into a spinning bath comprising an aqueous, at least 12% (by weight) solution of a thiosulfate.

2. A process for wet spinning of acrylonitrile polymer yarn which comprises extruding a solution, in a volatile organic solvent of acrylonitrile polymer containing a major portion of acrylonitrile, through a shaped orifice into a spinning bath comprising an aqueous, at least 12% (by weight) solution of a thiosulfate heated to a temperature of at least 70° C.

3. A process for wet spinning of acrylonitrile yarn which comprises extruding a solution, in a volatile organic solvent of an acrylonitrile polymer containing a major portion of acrylonitrile, through a shaped orifice into a spinning bath comprising an aqueous, at least 12% (by weight) solution of a thiosulfate heated to a temperature of at least 70° C., passing the yarn through said bath until it is substantially completely coagulated and stretching the yarn during its travel through the bath at least 100%.

4. A process for wet spinning of acrylonitrile yarn which comprises extruding a solution, in a volatile organic solvent of an acrylonitrile polymer containing a major portion of acrylonitrile, through a shaped orifice into a spinning bath comprising an aqueous, at least 12% (by weight) solution of a thiosulfate heated to a temperature of at least 70° C., passing the yarn through said bath until it is substantially completely coagulated and stretching the yarn during its travel through the bath at least 100%, removing said yarn from said bath and subsequently stretching said yarn at least 200%.

5. A process in accordance with claim 1 wherein the said volatile organic solvent is dimethylforamide.

6. A process in accordance with claim 1 wherein the said volatile organic solvent is gamma-butyrolactone.

7. A process in accordance with claim 1 wherein the said volatile organic solvent is ethylene carbonate.

8. A process in accordance with claim 1 wherein said acrylonitrile polymer is polyacrylonitrile.

9. A process in accordance with claim 1 wherein said thiosulfate is sodium thiosulfate.

10. A process for forming acrylonitrile polymer structures which comprises extruding a solution of said polymer in a volatile organic solvent, said polymer containing a major portion of acrylonitrile, through a shaped orifice into a spinning bath comprising an aqueous, at least 12% (by weight) solution of a thiosulfate.

11. A process for wet spinning of acrylonitrile yarn which comprises extruding a solution of an acrylonitrile polymer in gamma-butyrolactone at a temperature of about 100° C. through a shaped orifice into a spinning bath comprising about a 32%, by weight, aqueous solution of sodium thiosulfate maintained at a temperature of about 100° C.; passing the yarn through said bath until it is substantially completely coagulated; and stretching the yarn during its travel through the bath at least 100%.

WESTON ANDREW HARE.

No references cited.